US006662028B1

(12) United States Patent
Hayes et al.

(10) Patent No.: US 6,662,028 B1
(45) Date of Patent: Dec. 9, 2003

(54) MULTIPLE FREQUENCY INVERTED-F ANTENNAS HAVING MULTIPLE SWITCHABLE FEED POINTS AND WIRELESS COMMUNICATORS INCORPORATING THE SAME

(75) Inventors: Gerard James Hayes, Wake Forest, NC (US); Robert A. Sadler, Raleigh, NC (US)

(73) Assignee: Telefonaktiebolaget L.M. Ericsson, Stockholm (SE)

( * ) Notice: Subject to any disclaimer, the term of this patent is extended or adjusted under 35 U.S.C. 154(b) by 0 days.

(21) Appl. No.: 09/576,092

(22) Filed: May 22, 2000

(51) Int. Cl.7 ................................................ H04M 1/00

(52) U.S. Cl. ............................... 455/575.7; 455/552.1; 455/121; 455/129; 343/908

(58) Field of Search .......................... 455/575.7, 552.1, 455/129, 121; 343/700 MS, 906, 908

(56) References Cited

U.S. PATENT DOCUMENTS

| | | | | | |
|---|---|---|---|---|---|
| 6,061,025 A | | 5/2000 | Jackson et al. | ............. | 343/700 |
| 6,069,587 A | * | 5/2000 | Lynch et al. | ......... | 343/700 MS |
| 6,097,339 A | * | 8/2000 | Filipovic et al. | ............ | 343/702 |
| 6,255,994 B1 | * | 7/2001 | Saito | ................... | 343/700 MS |

FOREIGN PATENT DOCUMENTS

| | | |
|---|---|---|
| EP | 0892459 | 1/1999 |
| GB | 2316540 A | 2/1998 |
| JP | 10-224142 | 8/1998 |
| JP | 11163620 | 6/1999 |
| JP | 11008512 | 12/1999 |

OTHER PUBLICATIONS

Terry Kin–chung Lo and Yeongming Hwang, "Bandwidth Enhancement of PIFA Loaded with Very High Permittivity Material Using FDTD," *IEEE Antennas and Propagation Society International Symposium 1998 Digest Antennas: Gateways to the Global Network*, Atlanta GA Jun. 21–26, 1998; New York, NY: IEEE, US,vol. 2, Jun. 21, 1998, pp. 798–801.

Copy of International Search Report for PCT/US01/12170.

* cited by examiner

*Primary Examiner*—Marsha D. Banks-Harold
*Assistant Examiner*—James K Moore
(74) *Attorney, Agent, or Firm*—Myers Bigel Sibley & Sajovec

(57) ABSTRACT

Compact, planar inverted-F antennas are provided that radiate within multiple frequency bands for use within communications devices, such as radiotelephones. Multiple signal feeds extend from a conductive element in respective spaced-apart locations. A respective plurality of microelectromechanical systems (MEMS) switches are electrically connected to the signal feeds and are configured to selectively connect the respective signal feeds to ground or RF circuitry. In addition, each MEMS switch can be opened to electrically isolate a respective signal feed.

56 Claims, 8 Drawing Sheets

MULTIPLE FREQUENCY INVERTED-F ANTENNAS HAVING MULTIPLE SWITCHABLE FEED POINTS AND WIRELESS COMMUNICATORS INCORPORATING THE SAME

FIELD OF THE INVENTION

The present invention relates generally to antennas, and more particularly to antennas used with wireless communications devices.

BACKGROUND OF THE INVENTION

Radiotelephones generally refer to communications terminals which provide a wireless communications link to one or more other communications terminals. Radiotelephones may be used in a variety of different applications, including cellular telephone, land-mobile (e.g., police and fire departments), and satellite communications systems. Radiotelephones typically include an antenna for transmitting and/or receiving wireless communications signals. Historically, monopole and dipole antennas have been employed in various radiotelephone applications, due to their simplicity, wideband response, broad radiation pattern, and low cost.

However, radiotelephones and other wireless communications devices are undergoing miniaturization. Indeed, many contemporary radiotelephones are less than 11 centimeters in length. As a result, there is increasing interest in small antennas that can be utilized as internally-mounted antennas for radiotelephones.

In addition, it is becoming desirable for radiotelephones to be able to operate within multiple frequency bands in order to utilize more than one communications system. For example, GSM (Global System for Mobile) is a digital mobile telephone system that operates from 880 MHz to 960 MHz. DCS (Digital Communications System) is a digital mobile telephone system that operates from 1710 MHz to 1880 MHz. The frequency bands allocated for cellular AMPS (Advanced Mobile Phone Service) and D-AMPS (Digital Advanced Mobile Phone Service) in North America are 824–894 MHz and 1850–1990 MHz, respectively. Since there are two different frequency bands for these systems, radiotelephone service subscribers who travel over service areas employing different frequency bands may need two separate antennas unless a dual-frequency antenna is used.

In addition, radiotelephones may also incorporate Global Positioning System (GPS) technology and Bluetooth wireless technology. GPS is a constellation of spaced-apart satellites that orbit the Earth and make it possible for people with ground receivers to pinpoint their geographic location. Bluetooth technology provides a universal radio interface in the 2.45 GHz frequency band that enables portable electronic devices to connect and communicate wirelessly via short-range ad hoc networks.

Accordingly, radiotelephones incorporating these technologies may require additional antennas tuned for the particular frequencies of GPS and Bluetooth.

Inverted-F antennas are designed to fit within the confines of radiotelephones, particularly radiotelephones undergoing miniaturization. As is well known to those having skill in the art, inverted-F antennas typically include a linear (i.e., straight) conductive element that is maintained in spaced apart relationship with a ground plane. Examples of inverted-F antennas are described in U.S. Pat. Nos. 5,684,492 and 5,434,579 which are incorporated herein by reference in their entirety.

Conventional inverted-F antennas, by design, resonate within a narrow frequency band, as compared with other types of antennas, such as helices, monopoles and dipoles. In addition, conventional inverted-F antennas are typically large. Lumped elements can be used to match a smaller non-resonant antenna to an RF circuit. Unfortunately, such an antenna may be narrow band and the lumped elements may introduce additional losses in the overall transmitted/received signal, may take up circuit board space, and may add to manufacturing costs.

Unfortunately, it may be unrealistic to incorporate multiple antennas within a radiotelephone for aesthetic reasons as well as for space-constraint reasons. In addition, some way of isolating multiple antennas operating simultaneously in close proximity within a radiotelephone may also be necessary. As such, a need exists for small, internal radiotelephone antennas that can operate within multiple frequency bands.

SUMMARY OF THE INVENTION

In view of the above discussion, the present invention can provide compact, planar inverted-F antennas that can radiate within multiple frequencies for use within communications devices, such as radiotelephones. As used throughout, a "linear" conductive element is a conductive element that is straight (e.g., not bent or curved).

According to one embodiment of the present invention, a multi-frequency inverted-F antenna, includes a linear conductive element having opposite first and second sides and that extends along a longitudinal direction. First, second and third signal feeds are electrically connected to the linear conductive element and extend outwardly from the linear conductive element first side at respective first, second and third spaced-apart locations. A first switch, such as a microelectromechanical systems (MEMS) switch, is electrically connected to the first feed and is configured to selectively connect the first signal feed to ground. Alternatively, the first feed may be directly connected to ground. A second switch, such as a MEMS switch, is electrically connected to the second feed and is configured to selectively connect the second feed to either ground or a receiver and/or a transmitter that receives and/or transmits wireless communications signals. In addition, the second switch can be opened to electrically isolate the second signal feed. A third switch, such as a MEMS switch, is electrically connected to the third signal feed and is configured to selectively connect the third feed to either ground or a receiver/transmitter. In addition, the third switch can be opened to electrically isolate the third signal feed.

Antennas according to this embodiment of the present invention can radiate in a first frequency band when the first switch electrically connects the first feed to ground, when the second switch electrically connects the second feed to a receiver/transmitter, and when the third switch is open. Antennas according to this embodiment of the present invention may also radiate in a second frequency band different than the first frequency band when the first and second switches electrically connect the respective first and second feeds to ground, and when the third switch electrically connects the third feed to the receiver/transmitter.

According to another embodiment of the present invention, an additional signal feed may be utilized. For example, a fourth signal feed may be electrically connected to the above-described linear conductive element and extend outwardly from the linear conductive element first side at a fourth location. A fourth switch, such as a MEMS switch, may be electrically connected to the fourth feed and may be configured to selectively connect the fourth feed to either ground or a receiver/transmitter. In addition, the fourth switch can be opened to electrically isolate the fourth signal feed. Accordingly, antennas according to this embodiment of the present invention may radiate within a third frequency band that is different than the first and second frequency bands when the first, second, and third switches electrically connect the respective first, second, and third feeds to ground, and the fourth switch electrically connects the fourth feed to a receiver/transmitter.

Inverted-F antennas may be provided with various configurations of signal feeds according to additional embodiments of the present invention. As such, antennas according to the present invention may be particularly well suited for use within a variety of communications systems utilizing different frequency bands. Furthermore, because of their compact size, antennas according to the present invention may be easily incorporated within small communications devices. In addition, antennas according to the present invention, wherein one RF feed is activated at a time, overcome the need to isolate multiple, simultaneously operating antennas.

DETAILED DESCRIPTION OF THE INVENTION

Figure 1:
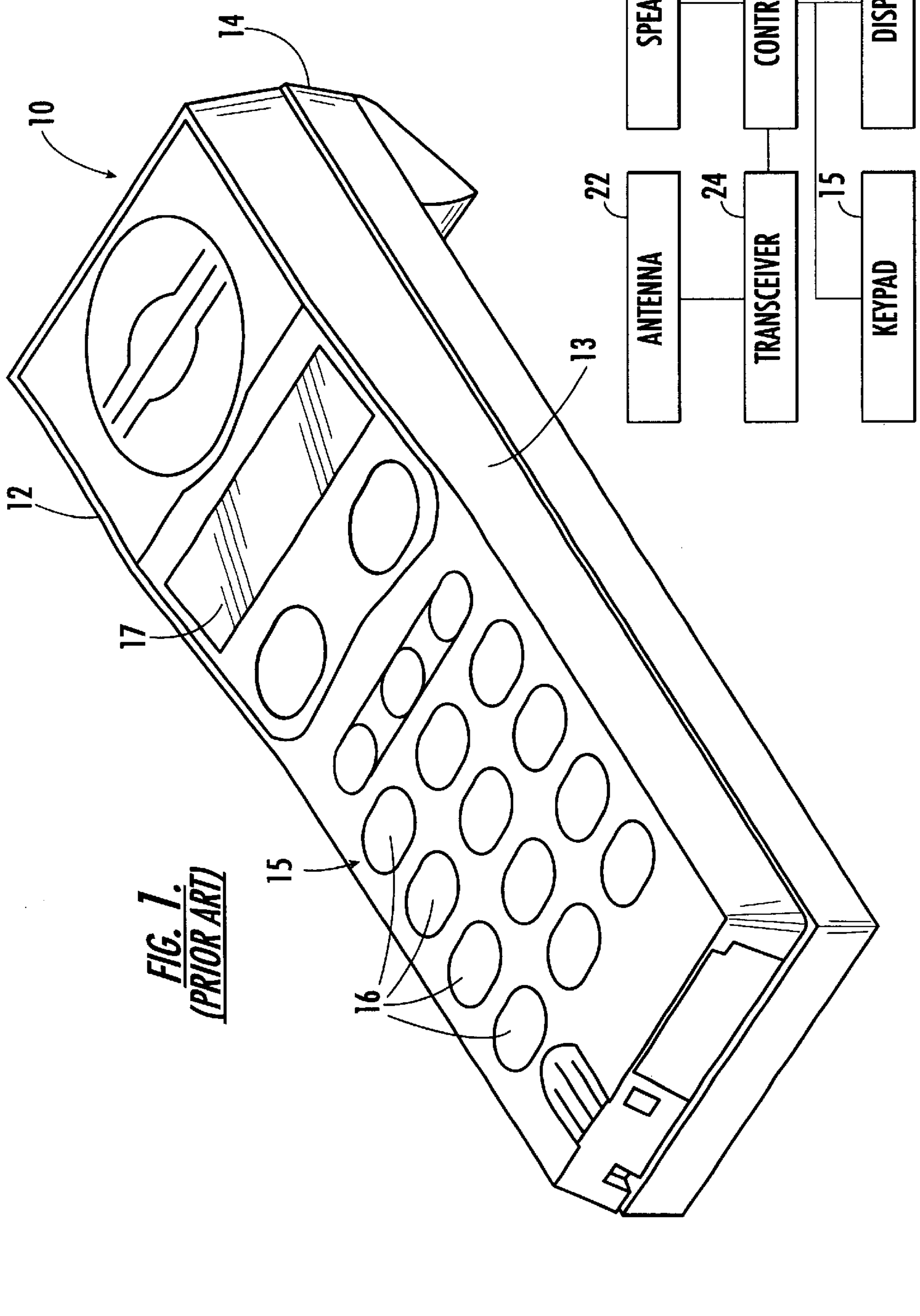
FIG. 1. (PRIOR ART)
FIG. 1 is a perspective view of an exemplary radiotelephone within which an antenna according to the present invention may be incorporated.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions may be exaggerated for clarity. Like numbers refer to like elements throughout the description of the drawings. It will be understood that when an element such as a layer, region or substrate is referred to as being "on" another element, it can be directly on the other element or intervening elements may also be present. In contrast, when an element is referred to as being "directly on" another element, there are no intervening elements present.

Referring now to FIG. 1, a radiotelephone 10, within which antennas according to various embodiments of the present invention may be incorporated, is illustrated. The housing 12 of the illustrated radiotelephone 10 includes a top portion 13 and a bottom portion 14 connected thereto to form a cavity therein. Top and bottom housing portions 13, 14 house a keypad 15 including a plurality of keys 16, a display 17, and electronic components (not shown) that enable the radiotelephone 10 to transmit and receive radiotelephone communications signals.

Figure 2:
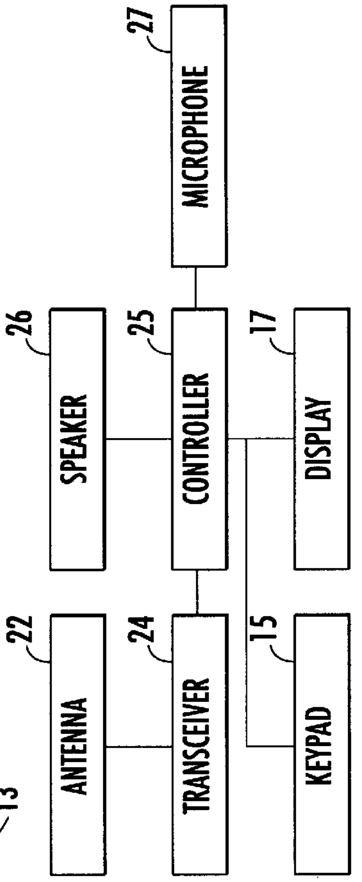
FIG. 2. (PRIOR ART)
FIG. 2 is a schematic illustration of a conventional arrangement of electronic components for enabling a radiotelephone to transmit and receive telecommunications signals.

A conventional arrangement of electronic components that enable a radiotelephone to transmit and receive radiotelephone communication signals is shown schematically in FIG. 2, and is understood by those skilled in the art of radiotelephone communications. An antenna 22 for receiving and transmitting radiotelephone communication signals is electrically connected to a radio-frequency transceiver 24 that is further electrically connected to a controller 25, such as a microprocessor. The controller 25 is electrically connected to a speaker 26 that transmits a remote signal from the controller 25 to a user of a radiotelephone. The controller 25 is also electrically connected to a microphone 27 that receives a voice signal from a user and transmits the voice signal through the controller 25 and transceiver 24 to a remote device. The controller 25 is electrically connected to a keypad 15 and display 17 that facilitate radiotelephone operation.

As is known to those skilled in the art of communications devices, an antenna is a device for transmitting and/or receiving electrical signals. A transmitting antenna typically includes a feed assembly that induces or illuminates an aperture or reflecting surface to radiate an electromagnetic field. A receiving antenna typically includes an aperture or surface focusing an incident radiation field to a collecting feed, producing an electronic signal proportional to the incident radiation. The amount of power radiated from or received by an antenna depends on its aperture area and is described in terms of gain.

Radiation patterns for antennas are often plotted using polar coordinates. Voltage Standing Wave Ratio (VSWR) relates to the impedance match of an antenna feed point with a feed line or transmission line of a communications device, such as a radiotelephone. To radiate radio frequency (RF) energy with minimum loss, or to pass along received RF energy to a radiotelephone receiver with minimum loss, the impedance of a radiotelephone antenna is conventionally matched to the impedance of a transmission line or feed point.

Conventional radiotelephones typically employ an antenna which is electrically connected to a transceiver operably associated with a signal processing circuit positioned on an internally disposed printed circuit board. In order to maximize power transfer between an antenna and a transceiver, the transceiver and the antenna are preferably interconnected such that their respective impedances are substantially "matched," i.e., electrically tuned to filter out or compensate for undesired antenna impedance components to provide a 50 Ohm (Ω) (or desired) impedance value at the feed point.

Figure 3:
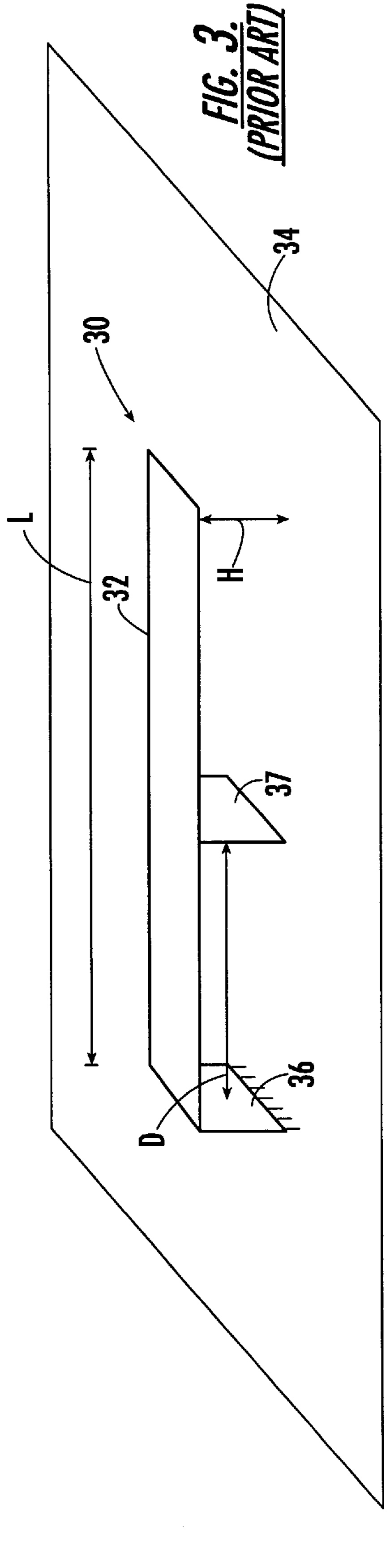
FIG. 3. (PRIOR ART)
FIG. 3 is a perspective view of a conventional planar inverted-F antenna.

Referring now to FIG. 3, a conventional planar inverted-F antenna is illustrated. The illustrated antenna 30 includes a linear conductive element 32 maintained in spaced-apart relationship with a ground plane 34. Conventional inverted-F antennas, such as that illustrated in FIG. 3, derive their name from a resemblance to the letter "F." The illustrated conductive element 32 is grounded to the ground plane 34 as indicated by 36. An RF connection 37 extends from underlying RF circuitry through the ground plane 34 to the conductive element 32.

Figure 4A:
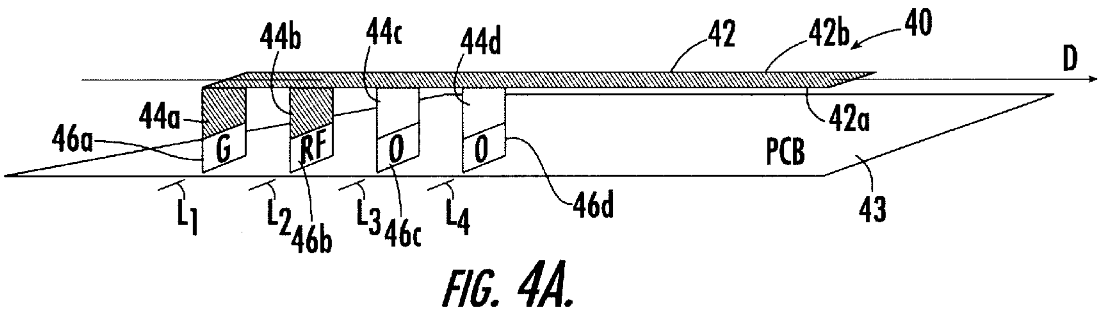
FIG. 4A is a perspective view of a planar inverted-F antenna having multiple switchable feed points according to an embodiment of the present invention, and wherein a first feed is connected to ground, a second feed is connected to RF circuitry, and third and fourth feeds are open such that the antenna is operative within a first frequency band.

Referring now to FIG. 4A, a multi-frequency inverted-F antenna 40 having a compact, linear configuration according to an embodiment of the present invention, is illustrated. The illustrated antenna 40 includes a linear conductive element 42 having opposite first and second sides 42*a*, 42*b*, and extending along a longitudinal direction D. The multi-frequency inverted-F antenna 40 is illustrated in an installed position within a wireless communications device, such as a radiotelephone (FIG. 1). The linear conductive element 42 is maintained in adjacent, spaced-apart relationship with a ground plane 43, such as a printed circuit board (PCB) within a radiotelephone (or other wireless communications device).

A first feed 44*a* is electrically connected to the linear conductive element 42 and extends outwardly from the linear conductive element first side 42*a* at a first location $L_1$, as illustrated. A second feed 44*b* is electrically connected to the linear conductive element 42 and extends outwardly from the linear conductive element first side 42*a* at a second location $L_2$, as illustrated. The second location $L_2$ is spaced-apart from the first location along the longitudinal direction D, as illustrated. A third feed 44*c* is electrically connected to the linear conductive element 42 and extends outwardly from the linear conductive element first side 42*a* at a third location $L_3$, as illustrated. The third location $L_3$ is spaced-apart from the first and second locations $L_1$, $L_2$ along the longitudinal direction D, as illustrated. A fourth feed 44*d* is electrically connected to the linear conductive element 42 and extends outwardly from the linear conductive element first side 42*a* at a fourth location $L_4$, as illustrated. The fourth location $L_4$ is spaced-apart from the first, second, and third locations $L_1$, $L_2$, $L_3$ along the longitudinal direction D.

Still referring to FIG. 4A, a first switch 46*a*, such as a micro-electromechanical systems (MEMS) switch, is electrically connected to the first feed 44*a* and is configured to selectively connect the first feed 44*a* to ground (e.g., to the ground plane 43). Alternatively, the first feed 44*a* may be directly connected to ground without a MEMS (or other) switch. It is understood that in each embodiment of the present invention, one or more feeds (typically the first feed and/or second feed) may be directly connected to ground without requiring a MEMS (or other) switch.

A MEMS switch is an integrated micro device that combines electrical and mechanical components fabricated using integrated circuit (IC) compatible batch-processing techniques and can range in size from micrometers to millimeters. MEMS devices in general, and MEMS switches in particular, are understood by those of skill in the art and need not be described further herein. Exemplary MEMS switches are described in U.S. Pat. No. 5,909,078. It also will be understood that conventional switches including relays and actuators may be used with antennas according to embodiments of the present invention. The present invention is not limited solely to the use of MEMS switches.

A second switch 46*b*, such as a MEMS switch, is electrically connected to the second feed 44*b* and is configured to selectively connect the second feed 44*b* to ground, to a receiver/transmitter that receives and/or sends wireless communications signals (e.g., radiotelephone signals), or to maintain the second feed 44*b* in an open circuit (i.e., the second MEMS switch 46*b* can be open). A third switch 46*c*, such as a MEMS switch, is electrically connected to the third feed 44*c* and is configured to selectively connect the third feed 44*c* to ground, to a receiver/transmitter that receives and/or sends wireless communications signals (e.g., radiotelephone signals), or to maintain the third feed 44*c* in an open circuit (i.e., the third MEMS switch 46*c* can be open). A fourth switch 46*d*, such as a MEMS switch, is electrically connected to the fourth feed 44*d* and is configured to selectively connect the fourth feed to ground, to a receiver/transmitter that receives and/or sends wireless communications signals (e.g., radiotelephone signals), or to maintain the fourth feed in an open circuit (i.e., the fourth MEMS switch 46*c* can be open).

Figure 4B:
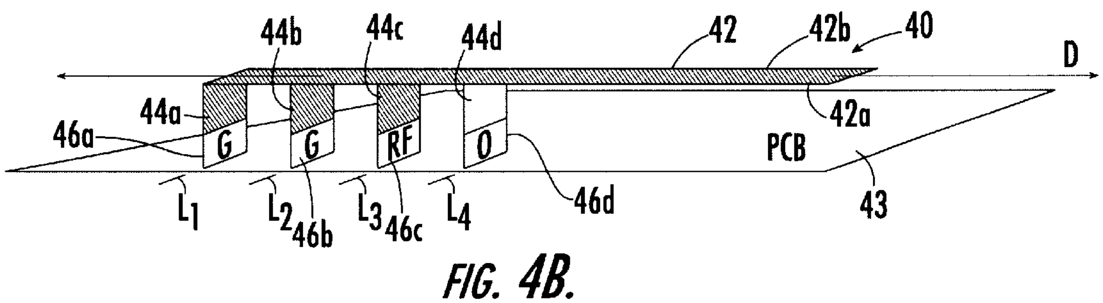
FIG. 4B is a perspective view of the antenna of FIG. 4A, wherein the first and second feeds are connected to ground, the third feed is connected to RF circuitry, and the fourth feed is open such that the antenna is operative within a second frequency band.
Figure 4C:
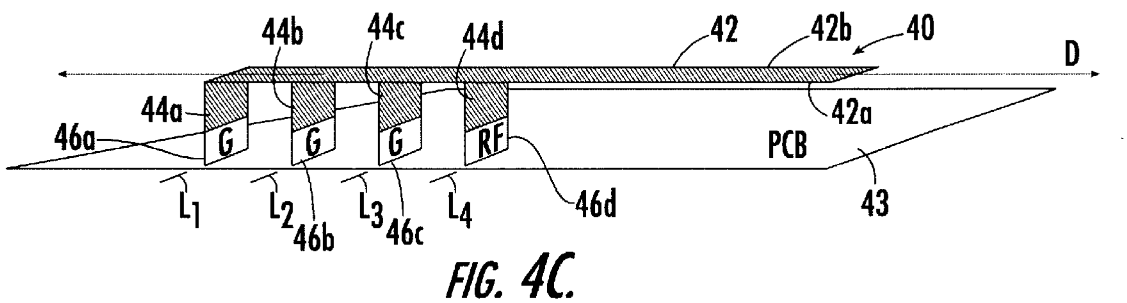
FIG. 4C is a perspective view of the antenna of FIG. 4A, wherein the first, second, and third feeds are connected to ground, and the fourth feed is connected to RF circuitry such that the antenna is operative within a third frequency band.

FIGS. 4A–4C illustrate how the various MEMS switches 46*a*–46*d* allow the multi-frequency inverted-F antenna 40 to radiate within multiple, different frequency bands, according to an embodiment of the present invention. As illustrated in FIG. 4A, the antenna 40 radiates in a first frequency band when the first MEMS switch 46*a* electrically connects the first feed 44*a* to ground (indicated by G) or when the first feed 44*a* is directly connected to ground (indicated by G), when the second MEMS switch 46*b* electrically connects the second feed 44*b* to a receiver/transmitter (indicated by RF), and when the third and fourth MEMS switches 46*c*, 46*d* are open (indicated by O).

As illustrated in FIG. 4B, the antenna 40 radiates in a second frequency band that is different from the first frequency band when the first MEMS switch 46*a* electrically connects the first feed 44*a* to ground (indicated by G) or when the first feed 44*a* is directly connected to ground (indicated by G), when the second MEMS switch 46*b* electrically connects the second feed 44*b* to ground (indicated by G), when the third MEMS switch 46*c* electrically connects the third feed 44*c* to a receiver/transmitter (indicated by RF), and when the fourth MEMS switch 46*d* is open (indicated by O). The second frequency band may be greater than the first frequency band. For example, the first frequency band may be between about 900 MHz and 960 MHz and the second frequency band may be between about 1200 MHz and 1400 MHz. However, it is understood that the second frequency band may also be a lower frequency band than the first frequency band.

As illustrated in FIG. 4C, the antenna 40 radiates in a third frequency band that is different from the first and second frequency bands when the first, second, and third MEMS switches 46*a*, 46*b*, 46*c* electrically connect the respective first, second, and third feeds 44*a*, 44*b*, 44*c* to ground (indicated by G) or when the first feed 44*a* is directly connected to ground (indicated by G), and when the fourth MEMS switch 46*d* electrically connects the fourth feed 44*d* to a receiver/transmitter (indicated by RF). The third frequency band may be greater than the first and second frequency bands. For example, the third frequency band may be between about 2200 MHz and 2400 MHz and the first and second frequency bands may be between about 900 MHz–960 MHz and 1200 MHz–1400 MHz, respectively. However, it is also understood that the third frequency band may be a lower frequency band than the first and second frequency bands.

Figure 5A:
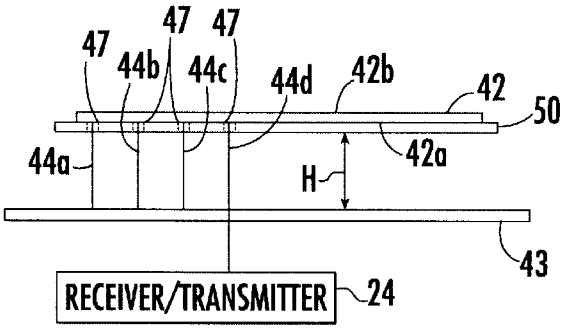
FIG. 5A is a side elevation view of a dielectric substrate having the antenna of FIGS. 4A–4C disposed thereon, and wherein the dielectric substrate is in adjacent, spaced-apart relation with a ground plane within a communications device, according to another embodiment of the present invention.

According to another embodiment of the present invention, illustrated in FIG. 5A, the planar, conductive element 42 of the antenna of FIGS. 4A–4C may be formed on a dielectric substrate 50, for example by etching a metal layer formed on the dielectric substrate. An exemplary material for use as a dielectric substrate 50 is FR4 or polyimide, which is well known to those having skill in the art of communications devices. However, various other dielectric materials also may be utilized. Preferably, the dielectric substrate 50 has a dielectric constant between about 2 and about 4. However, it is to be understood that dielectric substrates having different dielectric constants may be utilized without departing from the spirit and intent of the present invention.

The antenna 40 of FIG. 5A is illustrated in an installed position within a wireless communications device, such as a radiotelephone. The dielectric substrate 50 having a conductive element 42 disposed thereon is maintained in adjacent, spaced-apart relationship with a ground plane 43. In the illustrated configuration, the first, second, and third feeds 44*a*, 44*b*, 44*c* are electrically connected to ground (e.g., the ground plane 43) via respective first, second, and third MEMS switches (not shown). The fourth feed 44*d* is electrically connected to a receiver/transmitter 24 via a fourth MEMS switch (not shown). Each of the first, second, third and fourth feeds 44*a*, 44*b*, 44*c*, 44*d* extend through respective apertures 47 in the dielectric substrate 50. The distance H between the dielectric substrate 50 and the ground plane 43 is preferably maintained at between about 2 mm and about 10 mm.

Figure 5B:
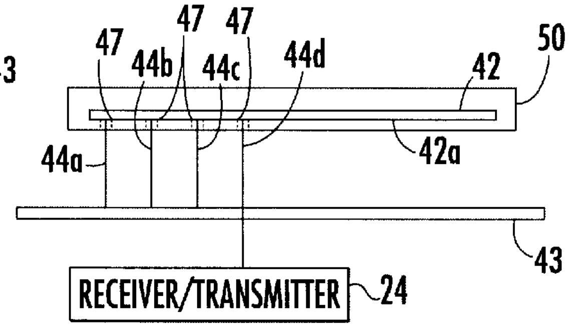
FIG. 5B is a side elevation view of a dielectric substrate having the antenna of FIGS. 4A–4C disposed therewithin, and wherein the dielectric substrate is in adjacent, spaced-apart relation with a ground plane within a communications device, according to another embodiment of the present invention.

According to another embodiment of the present invention, a linear conductive element 42 may be disposed within a dielectric substrate 50 as illustrated in FIG. 5B. In the illustrated configuration, the dielectric substrate 50 is in adjacent, spaced-apart relationship with a ground plane 43 within a wireless communications device, such as a radiotelephone. The first, second, and third feeds 44*a*, 44*b*, 44*c* are electrically connected to ground (e.g., the ground plane 43) via respective first, second, and third MEMS switches (not shown). The fourth feed 44*d* is electrically connected to a receiver/transmitter 24 via a fourth MEMS switch (not shown). Each of the first, second, third and fourth feeds 44*a*, 44*b*, 44*c*, 44*d* extend through respective apertures 47 in the dielectric substrate 50.

A preferred conductive material out of which the linear conductive element 42 of FIGS. 4A–4C and FIGS. 5A–5B may be formed is copper, typically 0.5 ounce (14 grams) copper. For example, the conductive element 42 may be formed from copper foil. Alternatively, the conductive element 42 may be a copper trace disposed on a substrate, as illustrated in FIG. 5A. However, a linear conductive element 42 according to the present invention may be formed from various conductive materials and is not limited to copper.

Figure 6A:
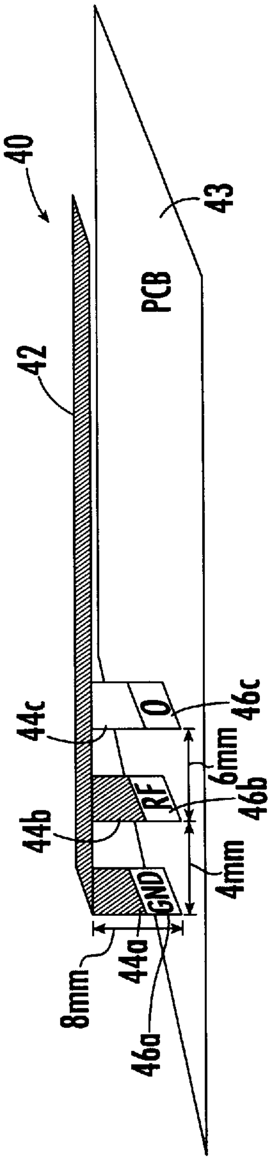
FIG. 6A is a perspective view of a planar inverted-F antenna having multiple switchable feed points according to an embodiment of the present invention, and wherein a first feed is connected to ground, a second feed is connected to RF circuitry, and a third feed is open such that the antenna is operative within a first frequency band.
Figure 6B:
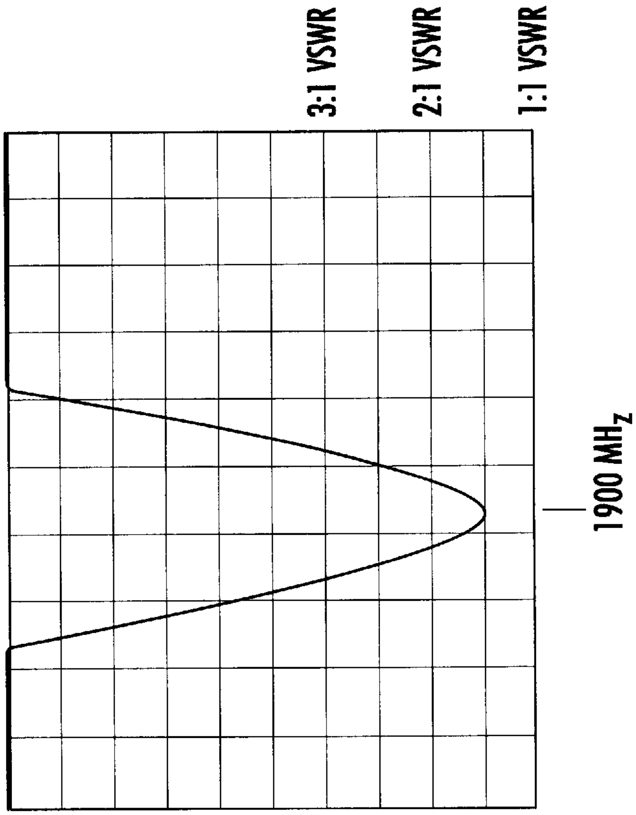
FIG. 6B is a graph of the VSWR performance of the antenna of FIG. 6A.

Referring now to FIGS. 6A–6B, an antenna 40 according to the above-described embodiment of the present invention has a plurality of MEMS switches configured such that the antenna 40 resonates around 1900 MHz (FIG. 6B). The illustrated antenna 40 includes first, second, and third feeds 44*a*, 44*b*, and 44*c*. Each feed includes a respective MEMS switch 46*a*, 46*b*, 46*c*, as described above. The first MEMS switch 46*a* electrically connects the first feed 44*a* to ground. Alternatively, the first feed 44*a* may be directly connected to ground. The second MEMS switch 46*b* electrically connects the second feed to a receiver/transmitter. The third MEMS switch 46*c* is open. In the illustrated embodiment, the linear conductive element 42 is spaced-apart from the ground plane 43 by a distance of eight millimeters (8 mm). The first and second feeds 44*a*, 44*b* are separated by 4 mm, and the second and third feeds are separated by 6 mm.

Figure 7A:
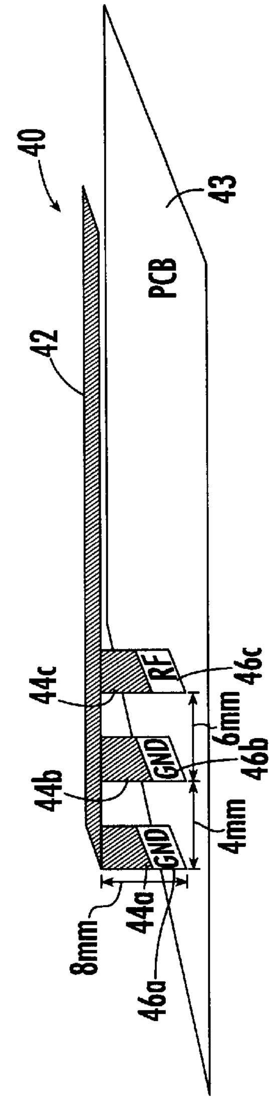
FIG. 7A is a perspective view of a planar inverted-F antenna having multiple switchable feed points according to an embodiment of the present invention, and wherein first and second feeds are connected to ground, and a third feed is connected to RF circuitry such that the antenna is operative within a second frequency band.
Figure 7B:
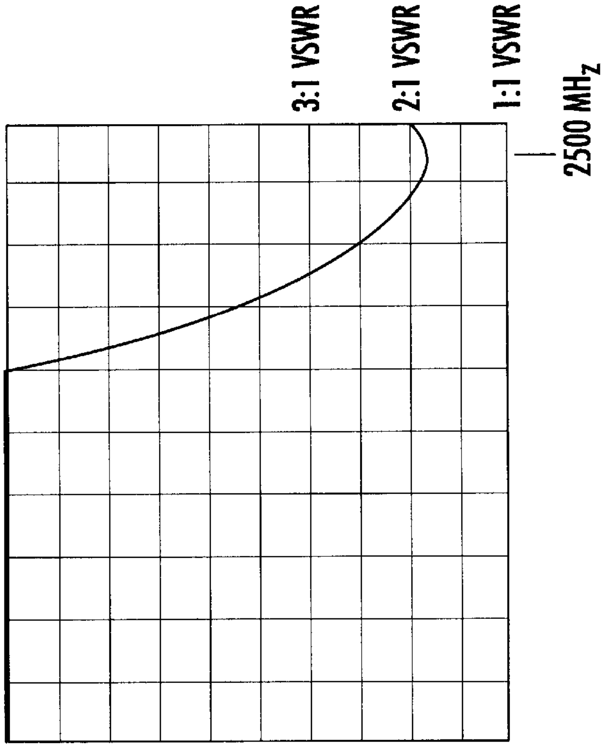
FIG. 7B is a graph of the VSWR performance of the antenna of FIG. 7A.

Referring now to FIGS. 7A–7B, an antenna 40 according to the above-described embodiment of the present invention has a plurality of MEMS switches configured such that the antenna 40 resonates around 2500 MHz (FIG. 7B). The illustrated antenna 40 includes first, second, and third feeds 44*a*, 44*b*, and 44*c*. Each feed includes a respective MEMS switch 46*a*, 46*b*, 46*c*, as described above. The first and second MEMS switches 46*a*, 46*b* electrically connect the respective first and second feeds 44*a*, 44*b* to ground. Alternatively, the first feed 44*a* may be directly connected to ground. The third MEMS switch 46*c* electrically connects the second feed to a receiver/transmitter. In the illustrated embodiment, the linear conductive element 42 is spaced-apart from the ground plane 43 by a distance of eight millimeters (8 mm). The first and second feeds 44*a*, 44*b* are separated by 4 mm, and the second and third feeds are separated by 6 mm.

Figure 8A:
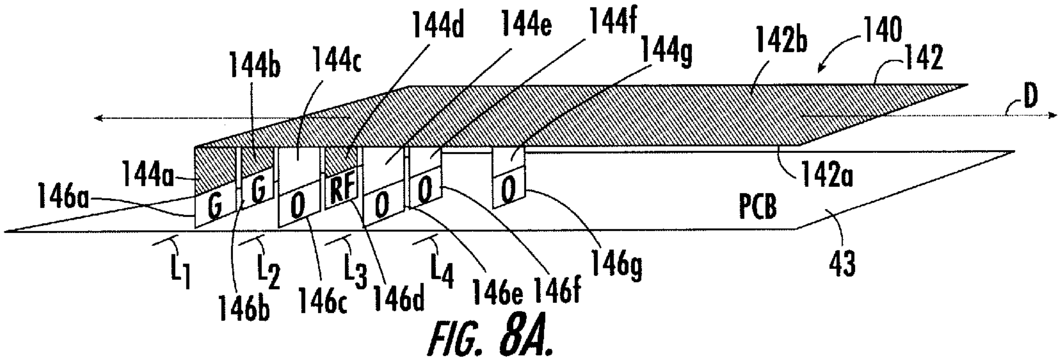
FIG. 8A is a perspective view of a planar inverted-F antenna having multiple switchable feed points according to another embodiment of the present invention, and wherein a first feed is connected to ground, a second feed is connected to RF circuitry, and third, fourth, fifth, sixth, and seventh feeds are open such that the antenna is operative within a first frequency band.
Figure 8B:
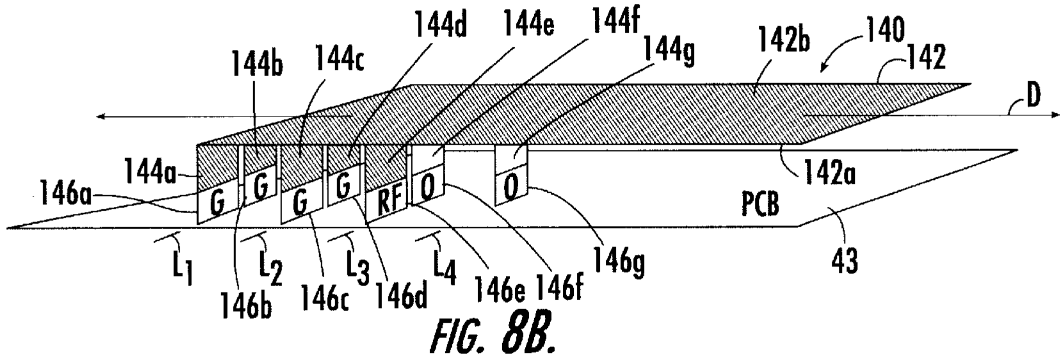
FIG. 8B is a perspective view of the antenna of FIG. 8A, wherein the first and second feeds are connected to ground, the third feed is connected to RF circuitry, and the fourth, fifth, sixth, and seventh feeds are open such that the antenna is operative within a second frequency band.
Figure 8C:
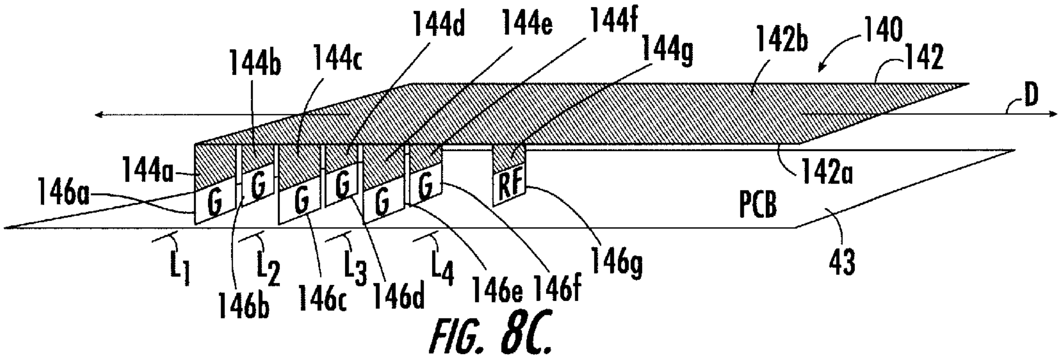
FIG. 8C is a perspective view of the antenna of FIG. 8A, wherein the first, second, and third feeds are connected to ground, the fourth feed is connected to RF circuitry, and the fifth, sixth, and seventh feeds are open such that the antenna is operative within a third frequency band.

Referring now to FIGS. 8A–8C, a multi-frequency planar inverted-F antenna 140 according to another embodiment of the present invention is illustrated. The antenna 140 includes a generally rectangular, linear conductive element 142 having opposite first and second sides 142a, 142b and extending along a longitudinal direction D. The multi-frequency inverted-F antenna 140 is illustrated in an installed position within a wireless communications device, such as a radiotelephone (FIG. 1). The linear conductive element 142 is maintained in adjacent, spaced-apart relationship with a ground plane 43, such as a printed circuit board (PCB) within a radiotelephone (or other wireless communications device).

First and second feeds 144a, 144b are electrically connected to the conductive element 142 and extend outwardly from the conductive element first side 142a in adjacent spaced-apart relationship at a first location $L_1$, as illustrated. Third and fourth feeds 144c, 144d are electrically connected to the conductive element 142 and extend outwardly from the conductive element first side 142a in adjacent spaced-apart relationship at a second location $L_2$, as illustrated. The second location $L_2$ is spaced-apart from the first location $L_1$ along the longitudinal direction D, as illustrated. Fifth and sixth feeds 144e, 144f are electrically connected to the conductive element 142 and extend outwardly from the conductive element first side 142a in adjacent spaced-apart relationship at a third location $L_3$, as illustrated. The third location $L_3$ is spaced-apart from the first and second locations $L_1$, $L_2$ along the longitudinal direction D, as illustrated. A seventh feed 144g is electrically connected to the conductive element 142 and extends outwardly from the conductive element first side 142a in adjacent spaced-apart relationship at a fourth location $L_4$, as illustrated. The fourth location $L_4$ is spaced-apart from the first, second, and third locations $L_1$, $L_2$, $L_3$ along the longitudinal direction D, as illustrated.

Respective first and second MEMS switches 146a, 146b are electrically connected to the respective first and second feeds 144a, 144b. The first MEMS switch 146a is configured to selectively connect the first feed 144a to ground. Alternatively, the first feed 144a may be directly connected to ground. The second MEMS switch 144b is configured to selectively connect the second feed 144b to ground. Alternatively, the second feed 144b may be directly connected to ground.

Respective third and fourth MEMS switches 146c, 146d are electrically connected to the respective third and fourth feeds 144c, 144d. The third and fourth MEMS switches 144c, 144d are configured to selectively connect the respective third and fourth feeds 144c, 144d to ground, to a receiver/transmitter that receives and/or sends wireless communications signals (e.g., radiotelephone signals), or to maintain the respective third and fourth feeds 144c, 144d in an open circuit (i.e., the third and fourth MEMS switches 146c, 146d can be open).

Respective fifth and sixth MEMS switches 146e, 146f are electrically connected to the respective fifth and sixth feeds 144e, 144f. The fifth and sixth MEMS switches 144e, 144f are configured to selectively connect the respective fifth and sixth feeds 144e, 144f to ground, to a receiver/transmitter that receives and/or sends wireless communications signals (e.g., radiotelephone signals), or to maintain the respective fifth and sixth feeds in an open circuit (i.e., the fifth and sixth MEMS switches 146e, 146f can be open).

A seventh MEMS switch 146g is electrically connected to the respective seventh feed 144g. The seventh MEMS switch 144g is configured to selectively connect the seventh feed 144g to a receiver/transmitter that receives and/or sends wireless communications signals (e.g., radiotelephone signals), or to maintain the seventh feed in an open circuit (i.e., the seventh MEMS switch 146e, 146f can be open).

FIGS. 8A–8C illustrate how the various MEMS switches 146a–146g allow the multi-frequency inverted-F antenna 140 to radiate within multiple, different frequency bands. As illustrated in FIG. 8A, the antenna 140 radiates in a first frequency band radiates in a first frequency band when the first and second MEMS switches 146a, 146b electrically connect the first and second feeds 144a, 144b to ground (indicated by G) or when the first and/or second feeds 144a, 144b are directly connected to ground, when the fourth MEMS switch 146d electrically connects the fourth feed 144d to the receiver/transmitter (indicated by RF), and when the third, fifth, sixth, and seventh MEMS switches 146c, 146e, 146f, 146g are open (indicated by O).

As illustrated in FIG. 8B, the antenna 140 radiates in a second frequency band when the first, second, third, and fourth MEMS switches 146a, 146b, 146c, 146d electrically connect the respective first, second, third, and fourth feeds 144a, 144b, 144c, 144d to ground (indicated by G), when the fifth MEMS switch 146e electrically connects the fifth feed 144e to the receiver/transmitter (indicated by RF), and when the remaining MEMS switches (i.e., the sixth and seventh MEMS switches 146f, 146g) are open (indicated by O). The second frequency band may be greater than the first frequency band. For example, the first frequency band may be between about 900 MHz and 960 MHz and the second frequency band may be between about 1200 MHz and 1400 MHz. However, it is understood that the second frequency band may also be a lower frequency band than the first frequency band.

As illustrated in FIG. 8C, the antenna 140 radiates in a third frequency band that is different from the first and second frequency bands when the first, second, third, fourth, fifth, and sixth MEMS switches electrically connect the respective first, second, third, fourth, fifth, and sixth feeds to ground (indicated by G), and when the seventh MEMS switch 146g electrically connects the seventh feed 144g to the receiver/transmitter (indicated by RF). The third frequency band may be greater than the first and second frequency bands. For example, the third frequency band may be between about 2200 MHz and 2400 MHz and the first and second frequency bands may be between about 900 MHz–960 MHz and 1200 MHz–1400 MHz, respectively. However, it is also understood that the third frequency band may be a lower frequency band than the first and second frequency bands.

The antenna 140 may be operative within additional frequency bands by connecting the various feeds in different configurations via the various MEMS switches (146a–146g).

As described above with respect to FIGS. 5A–5B, the illustrated antenna 140 of FIGS. 8A–8C may have the conductive element 142 formed on a dielectric substrate 50 (See FIG. 5A). Alternatively, the illustrated antenna 140 of FIGS. 8A–8C may have the conductive element 142 disposed within a dielectric substrate 50 (See FIG. 5B).

Figure 9:
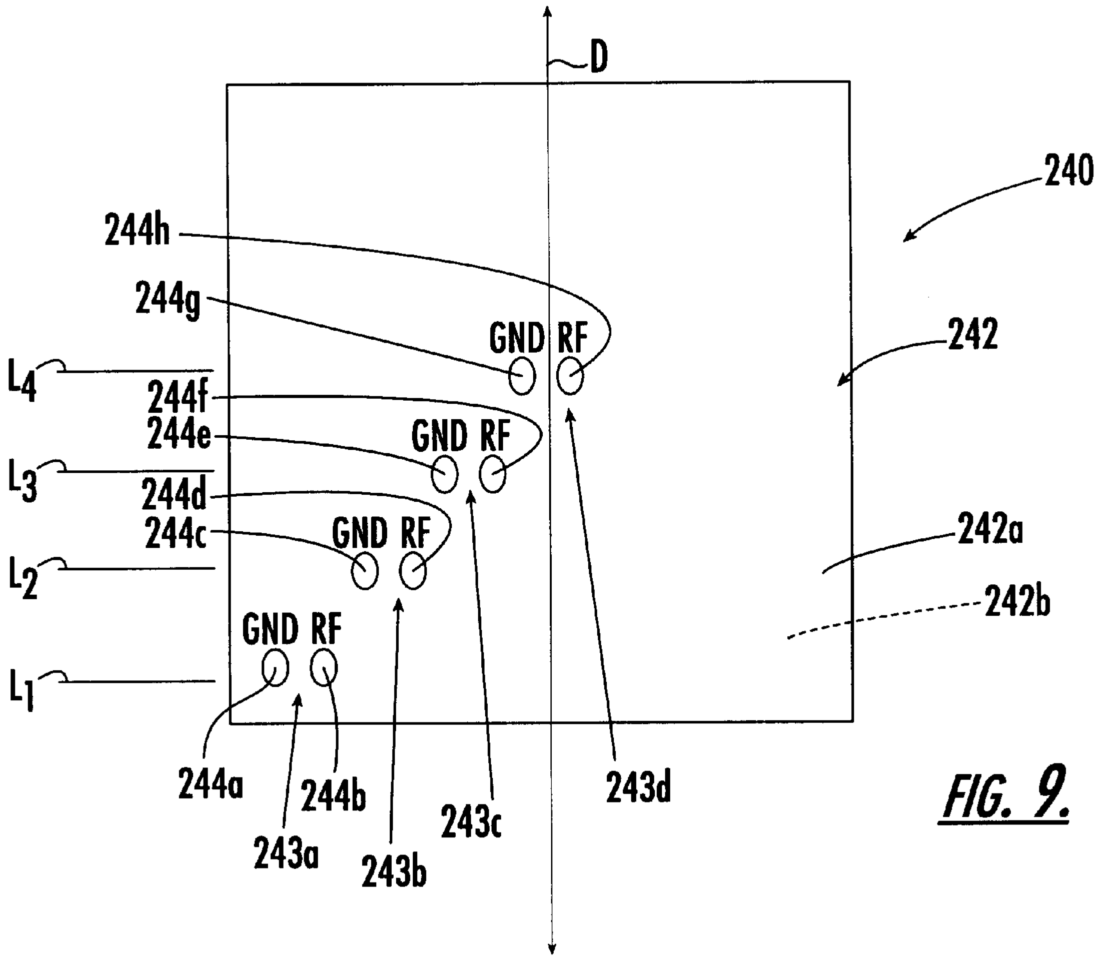
FIG. 9 is a bottom plan view of a multi-frequency planar inverted-F antenna according to another embodiment of the present invention.

Referring now to FIG. 9, a multi-frequency planar inverted-F antenna 240 according to another embodiment of the present invention is illustrated. The antenna 240 includes a generally rectangular, linear conductive element 242 having opposite first and second sides 242a, 242b and extending along a longitudinal direction D. A plurality of pairs of feeds 243a–243d are electrically connected to the conductive element 242 and extend outwardly from the conductive element first side 242a in adjacent, spaced-apart relationship along the longitudinal direction D. A respective one of the feeds in each pair is configured to be electrically connected to ground. The other one of the feeds in each pair is configured to be electrically connected to a receiver/transmitter. When a particular pair of feeds are "active", the remaining pairs of feeds are open circuited.

For example, first and second feeds **244*a*, 244*b* make up the first pair of feeds 243a and are electrically connected to the conductive element 242. The first and second feeds 244*a*, 244*b* extend outwardly from the conductive element first side 242*a* in adjacent spaced-apart relationship at a first location $L_1$. Third and fourth feeds 244*c*, 244*d* make up a second pair of feeds 243b and are electrically connected to the conductive element 242. The third and fourth feeds 244*c*, 244*d* extend outwardly from the conductive element first side 242*a*** in adjacent spaced-apart relationship at a second location $L_2$. As illustrated, the second location $L_2$ is spaced-apart from the first location $L_1$ along the longitudinal direction D.

Fifth and sixth feeds **244*e*, 244*f* make up a third pair of feeds 243*c* and are electrically connected to the conductive element 242 and extend outwardly from the conductive element first side 242** in adjacent spaced-apart relationship at a third location $L_3$, as illustrated. The third location $L_3$ is spaced-apart from the second location $L_2$ along the longitudinal direction D, as illustrated.

Seventh and eighth feeds **244*g*, 244*h* make up a fourth pair of feeds 243d and are electrically connected to the conductive element 242. The seventh and eighth feeds 244*g*, 244*h* extend outwardly from the conductive element first side 242*a*** in adjacent spaced-apart relationship at a fourth location $L_4$, as illustrated. The fourth location $L_4$ is spaced-apart from the first, second, and third locations $L_2$, $L_3$, $L_4$ along the longitudinal direction D, as illustrated.

Respective first and second MEMS switches (not shown) are electrically connected to the respective first and second feeds **244*a*, 244*b*. The first MEMS switch is configured to selectively connect the first feed 244*a* to ground or to open. The second MEMS switch is configured to selectively connect the second feed 244*b* to a receiver/transmitter that receives and/or sends wireless communications signals (e.g., radiotelephone signals), or to maintain the second feed 244*b*** in an open circuit.

Respective third and fourth MEMS switches (not shown) are electrically connected to the respective third and fourth feeds **244*c*, 244*d*. The third MEMS switch is configured to selectively connect the third feed 244*c* to ground or to maintain the third feed 244*c* in an open circuit. The fourth MEMS switch is configured to selectively connect the fourth feed 244*d* to a receiver/transmitter that receives and/or sends wireless communications signals (e.g., radiotelephone signals), or to maintain the fourth feed 244*d*** in an open circuit.

Respective fifth and sixth MEMS switches (not shown) are electrically connected to the respective fifth and sixth feeds **244*e*, 244*f*. The fifth MEMS switch is configured to selectively connect the fifth feed 244*e* to ground or to maintain the fifth feed 244*e* in an open circuit. The sixth MEMS switch is configured to selectively connect the sixth feed 244*f* to a receiver/transmitter that receives and/or sends wireless communications signals (e.g., radiotelephone signals), or to maintain the sixth feed 244*f*** in an open circuit.

Respective seventh and eighth MEMS switches (not shown) are electrically connected to the respective seventh and eighth feeds **244*g*, 244*h*. The seventh MEMS switch is configured to selectively connect the seventh feed 244*g* to ground or to maintain the seventh feed 244*g* in an open circuit. The eighth MEMS switch is configured to selectively connect the eighth feed 244*h* to a receiver/transmitter that receives and/or sends wireless communications signals (e.g., radiotelephone signals), or to maintain the eighth feed 244*h*** in an open circuit.

The antenna 240 radiates in a first frequency band when the first MEMS switch electrically connects the first feed **244*a* to ground, when the second MEMS switch electrically connects the second feed 244*b*** to a receiver/transmitter, and when the remaining MEMS switches (i.e., the third, fourth, fifth, sixth, seventh, and eighth MEMS switches) are open.

The antenna 240 radiates in a second frequency band different from the first frequency band when the third MEMS switch electrically connects the third feed **244*c* to ground, when the fourth MEMS switch electrically connects the fourth feed 244*d*** to a receiver/transmitter, and when the remaining MEMS switches (i.e., the first, second, fifth, sixth, seventh, and eighth MEMS switches) are open.

The antenna 240 radiates in a third frequency band different from the first and second frequency bands when the fifth MEMS switch electrically connects the fifth feed **244*e* to ground, when the sixth MEMS switch electrically connects the sixth feed 244*f*** to a receiver/transmitter, and when the remaining MEMS switches (i.e., the first, second, third, fourth, seventh, and eighth MEMS switches) are open.

The antenna 240 radiates in a fourth frequency band different from the first, second, and third frequency bands when the seventh MEMS switch electrically connects the seventh feed **244*g* to ground, when the eighth MEMS switch electrically connects the eighth feed 244*h*** to a receiver/transmitter, and when the remaining MEMS switches (i.e., the first, second, third, fourth, fifth, and sixth MEMS switches) are open.

As described above with respect to FIGS. 5A–5B, the illustrated antenna 240 of FIG. 9 may have the conductive element 242 formed on a dielectric substrate 50 (See FIG. 5A). Alternatively, the illustrated antenna 240 of FIGS. 8A–8C may have the conductive element 242 disposed within a dielectric substrate 50 (See FIG. 5B).

It is to be understood that the present invention is not limited to the illustrated configurations of the conductive elements 42, 142, 242 of FIGS. 4A–4C, 8A–8C, and 9, respectively. Various configurations may be utilized, without limitation. For example, conductive elements 42, 142, 242 may have non-rectangular and/or non-planar configurations.

Antennas according to the present invention may also be used with wireless communications devices which only transmit or receive radio frequency signals. Such devices which only receive signals may include conventional AM/FM radios or any receiver utilizing an antenna. Devices which only transmit signals may include remote data input devices.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A multi-frequency inverted-F antenna, comprising:

a linear conductive element having opposite first and second sides, wherein the linear conductive element extends along a longitudinal direction;

a first feed electrically connected to the linear conductive element and to ground and that extends outwardly from the linear conductive element first side at a first location;

a second feed electrically connected to the linear conductive element and extending outwardly from the linear conductive element first side at a second location, wherein the second location is spaced-apart from the first location along the longitudinal direction;

a switch electrically connected to the second feed and configured to selectively connect the second feed to ground or to a receiver that receives wireless communications signals or to a transmitter that transmits wireless communications signals or to maintain the second feed in an open circuit;

a third feed electrically connected to the linear conductive element and extending outwardly from the linear conductive element first side at a third location, wherein the third location is spaced-apart from the first and second locations along the longitudinal direction; and a switch electrically connected to the third feed and configured to selectively connect the third feed to ground or to the receiver or to the transmitter or to maintain the third feed in an open circuit;

wherein the antenna radiates in a first frequency band when the first feed is connected to ground, when the second feed is electrically connected to the receiver or to the transmitter, and when the third feed switch is open; and wherein the antenna radiates in a second frequency band different than the first frequency band when the first and second feeds are electrically connected to ground, and when the third feed switch electrically connects the third feed to the receiver or to the transmitter.

2. The wireless communicator according to claim 1 wherein the second and third feed switches comprise microelectromechanical systems (MEMS) switches.

3. The antenna according to claim 1 further comprising:

a fourth feed electrically connected to the linear conductive element and extending outwardly from the linear conductive element first side at a fourth location, wherein the fourth location is spaced-apart from the first, second, and third locations along the longitudinal direction; and a switch electrically connected to the fourth feed and configured to selectively connect the fourth feed to ground or to the receiver or to the transmitter or to maintain the fourth feed in an open circuit;

wherein the antenna radiates in a third frequency band different than the first and second frequency bands when the first, second, and third feeds are connected to ground, and the fourth feed is electrically connected to the receiver or to the transmitter.

4. The antenna according to claim 3 wherein the fourth feed switch is configured to open when at least one of the second and third feed switches electrically connects the respective second and third feeds to the receiver or to the transmitter.

5. The antenna according to claim 1 wherein the linear conductive element is disposed on a dielectric substrate.

6. The antenna according to claim 1 wherein the linear conductive element is disposed within a dielectric substrate.

7. The antenna according to claim 1 wherein the linear conductive element has a rectangular-shaped configuration.

8. A wireless communicator, comprising:

a housing configured to enclose a transceiver that transmits and receives wireless communications signals;

a ground plane disposed within the housing; and an inverted-F antenna, comprising:

a linear conductive element having opposite first and second sides, wherein the linear conductive element extends along a longitudinal direction, and wherein the linear conductive element is in adjacent, spaced-apart relationship with the ground plane;

a first feed electrically connected to the linear conductive element and to ground and that extends outwardly from the linear conductive element first side at a first location;

a second feed electrically connected to the linear conductive element and extending outwardly from the linear conductive element first side at a second location, wherein the second location is spaced-apart from the first location along the longitudinal direction;

a switch electrically connected to the second feed and configured to selectively connect the second feed to ground or the transceiver;

a third feed electrically connected to the linear conductive element and extending outwardly from the linear conductive element first side at a third location, wherein the third location is spaced-apart from the first and second locations along the longitudinal direction; and a switch electrically connected to the third feed and configured to selectively connect the third feed to ground or the transceiver or to maintain the third feed in an open circuit;

wherein the antenna radiates in a first frequency band when the first feed is electrically connected to ground, when the second feed is electrically connected to the transceiver, and when the third switch is open; and wherein the antenna radiates in a second frequency band different than the first frequency band when the first and second feeds are connected to ground, and when the third feed is electrically connected to the transceiver.

9. The wireless communicator according to claim 8 wherein the second and third feed switches comprise microelectromechanical systems (MEMS) switches.

10. The wireless communicator according to claim 9 further comprising:

a fourth feed electrically connected to the linear conductive element and extending outwardly from the linear conductive element first side at a fourth location, wherein the fourth location is spaced-apart from the first, second, and third locations along the longitudinal direction; and a MEMS switch electrically connected to the fourth feed and configured to selectively connect the fourth feed to ground or to the transceiver or to maintain the fourth feed in an open circuit;

wherein the antenna radiates in a third frequency band different than the first and second frequency bands when the first, second, and third feeds are electrically connected to ground, and the fourth feed is electrically connected to the transceiver.

11. The wireless communicator according to claim 10 wherein the fourth feed MEMS switch is configured to electrically connect the fourth feed to an open circuit when at least one of the second and third feed MEMS switches electrically connects the respective second and third feeds to the transceiver.

12. The wireless communicator according to claim 8 wherein the linear conductive element is disposed on a dielectric substrate.

13. The wireless communicator according to claim 8 wherein the linear conductive element is disposed within a dielectric substrate.

14. The wireless communicator according to claim 8 wherein the linear conductive element has a rectangular-shaped configuration.

15. A multi-frequency planar inverted-F antenna, comprising:

a planar, linear conductive element having opposite first and second sides, wherein the planar, linear conductive element extends along a longitudinal direction;

first and second feeds electrically connected to the planar, linear conductive element and to ground, and that extend outwardly from the planar, linear conductive element first side in adjacent spaced-apart relationship at a first location along the longitudinal direction;

third and fourth feeds electrically connected to the planar, linear conductive element and extending outwardly from the planar, linear conductive element first side in adjacent spaced-apart relationship at a second location along the longitudinal direction, wherein the second location is spaced-apart from the first location along the longitudinal direction;

respective switches electrically connected to the respective third and fourth feeds and configured to selectively connect the third and fourth feeds to ground or to a receiver or to a transmitter or to maintain the respective third and fourth feeds in an open circuit;

fifth and sixth feeds electrically connected to the planar, linear conductive element and extending outwardly from the planar, linear conductive element first side in adjacent spaced-apart relationship at a third location along the longitudinal direction, wherein the third location is spaced-apart from the first location along the longitudinal direction;

respective switches electrically connected to the respective fifth and sixth feeds and configured to selectively connect the fifth and sixth feeds to ground or to the receiver or to the transmitter or to maintain the respective fifth and sixth feeds in an open circuit;

wherein the antenna radiates in a first frequency band when the first and second feeds are electrically connected to ground, when the fourth feed is electrically connected to the receiver or to the transmitter, and when the third, fifth and sixth feed switches are open; and wherein the antenna radiates in a second frequency band greater than the first frequency band when the first, second, third, and fourth feeds are electrically connected to ground, when the fifth feed is electrically connected to the receiver or to the transmitter, and when the sixth feed switch is open.

16. The antenna according to claim 15 further comprising:

a seventh feed electrically connected to the planar, linear conductive element and extending outwardly from the planar, linear conductive element first side in adjacent spaced-apart relationship at a fourth location along the longitudinal direction, wherein the fourth location is spaced-apart from the first location along the longitudinal direction;

a switch electrically connected to the seventh feed and configured to selectively connect the seventh feed to the receiver or to the transmitter or to maintain the respective seventh feed in an open circuit; and wherein the antenna radiates in a third frequency band different than the first and second frequency bands when the first, second, third, fourth, fifth, and sixth feeds are electrically connected to ground, and the seventh feed is electrically connected to the receiver or to the transmitter.

17. The antenna according to claim 15 wherein the second, third, fourth, fifth, and sixth feed switches comprise micro-electromechanical systems (MEMS) switches.

18. The antenna according to claim 16 wherein the seventh feed switch comprises a micro-electromechanical systems (MEMS) switch.

19. The antenna according to claim 15 wherein the planar, linear conductive element is disposed on a dielectric substrate.

20. The antenna according to claim 15 wherein the planar, linear conductive element is disposed within a dielectric substrate.

21. The antenna according to claim 15 wherein the planar, linear conductive element has a rectangular-shaped configuration.

22. A wireless communicator, comprising:

a housing configured to enclose a transceiver that transmits and receives wireless communications signals;

a ground plane disposed within the housing; and a multi-frequency planar inverted-F antenna, comprising:

a planar, linear conductive element having opposite first and second sides, wherein the planar, linear conductive element extends along a longitudinal direction;

first and second feeds electrically connected to the planar, linear conductive element and to ground, and that extend outwardly from the planar, linear conductive element first side in adjacent spaced-apart relationship at a first location along the longitudinal direction;

third and fourth feeds electrically connected to the planar, linear conductive element and extending outwardly from the planar, linear conductive element first side in adjacent spaced-apart relationship at a second location along the longitudinal direction, wherein the second location is spaced-apart from the first location along the longitudinal direction;

respective switches electrically connected to the respective third and fourth feeds and configured to selectively connect the third and fourth feeds to ground or to the transceiver or to maintain the respective third and fourth feeds in an open circuit;

fifth and sixth feeds electrically connected to the planar, linear conductive element and extending outwardly from the planar, linear conductive element first side in adjacent spaced-apart relationship at a third location along the longitudinal direction, wherein the third location is spaced-apart from the first location along the longitudinal direction;

respective switches electrically connected to the respective fifth and sixth feeds and configured to selectively connect the fifth and sixth feeds to ground or to the transceiver or to maintain the respective fifth and sixth feeds in an open circuit;

wherein the antenna radiates in a first frequency band when the first and second feeds are electrically connected to ground, when the fourth feed is electrically connected to the transceiver, and when the third, fifth and sixth feed switches are open; and wherein the antenna radiates in a second frequency band greater than the first frequency band when the first, second, third, and fourth feeds are electrically connected to ground, when the fifth feed is electrically connected to the transceiver, and when the sixth feed switch is open.

23. The wireless communicator according to claim 22 further comprising:

a seventh feed electrically connected to the planar, linear conductive element and extending outwardly from the planar, linear conductive element first side in adjacent spaced-apart relationship at a fourth location along the longitudinal direction, wherein the fourth location is spaced-apart from the first location along the longitudinal direction;

a switch electrically connected to the seventh feed and configured to selectively connect the seventh feed to the transceiver or to maintain the respective seventh feed in an open circuit; and wherein the antenna radiates in a third frequency band different than the first and second frequency bands when the first, second, third, fourth, fifth, and sixth feeds are electrically connected to ground, and the seventh feed is electrically connected to the transceiver.

24. The wireless communicator according to claim 22 wherein the second, third, fourth, fifth, and sixth feed switches comprise micro-electromechanical systems (MEMS) switches.

25. The wireless communicator according to claim 23 wherein the seventh feed switch comprises a micro-electromechanical systems (MEMS) switch.

26. The wireless communicator according to claim 22 wherein the planar, linear conductive element is disposed on a dielectric substrate.

27. The wireless communicator according to claim 22 wherein the planar, linear conductive element is disposed within a dielectric substrate.

28. The wireless communicator according to claim 22 wherein the planar, linear conductive element has a rectangular-shaped configuration.

29. A multi-frequency planar inverted-F antenna, comprising:

a planar, linear conductive element having opposite first and second sides, wherein the planar, linear conductive element extends along a longitudinal direction;

first and second feeds electrically connected to the planar, linear conductive element and extending outwardly from the planar, linear conductive element first side in adjacent spaced-apart relationship at a first location along the longitudinal direction;

respective first and second switches electrically connected to the respective first and second feeds, wherein the first switch is configured to selectively connect the first feed to ground or to maintain the first feed in an open circuit, and wherein the second switch is configured to selectively connect the second feed to a receiver that receives wireless communications signals or to a transmitter that transmits wireless communications signals or to maintain the second feed in an open circuit;

third and fourth feeds electrically connected to the planar, linear conductive element and extending outwardly from the planar, linear conductive element first side in adjacent spaced-apart relationship at a second location along the longitudinal direction, wherein the second location is spaced-apart from the first location along the longitudinal direction;

respective third and fourth switches electrically connected to the respective third and fourth feeds, wherein the third switch is configured to selectively connect the third feed to ground or to maintain the third feed in an open circuit, and wherein the fourth switch is configured to selectively connect the fourth feed to a receiver that receives wireless communications signals or to a transmitter that transmits wireless communications signals or to maintain the fourth feed in an open circuit;

wherein the antenna radiates in a first frequency band when the first switch electrically connects the first feed to ground, when the second switch electrically connects the second feed to a receiver or to a transmitter, and when the third and fourth switches are open;

wherein the antenna radiates in a second frequency band different than the first frequency band when the first and second switches are open, when the third switch electrically connects the third feed to ground, and when the fourth switch electrically connects the fourth feed to a receiver or to a transmitter.

30. The antenna according to claim 29 wherein the first, second, third, and fourth switches comprise microelectromechanical systems (MEMS) switches.

31. The antenna according to claim 29 further comprising:

fifth and sixth feeds electrically connected to the planar, linear conductive element and extending outwardly from the planar, linear conductive element first side in adjacent spaced-apart relationship at a third location along the longitudinal direction, wherein the third location is spaced-apart from the first and second locations along the longitudinal direction;

respective fifth and sixth switches electrically connected to the respective fifth and sixth feeds, wherein the fifth switch is configured to selectively connect the fifth feed to ground or to maintain the fifth feed in an open circuit, and wherein the sixth switch is configured to selectively connect the sixth feed to a receiver that receives wireless communications signals or to a transmitter that transmits wireless communications signals or to maintain the sixth feed in an open circuit;

wherein the antenna radiates in a third frequency band different than the first and second frequency bands when the first, second, third, and fourth switches are open, when the fifth switch electrically connects the fifth feed to ground, and when the sixth switch electrically connects the sixth feed to a receiver or to a transmitter.

32. The antenna according to claim 31 wherein the fifth and sixth switches comprise micro-electromechanical systems (MEMS) switches.

33. The antenna according to claim 31 further comprising:

seventh and eighth feeds electrically connected to the planar, linear conductive element and extending outwardly from the planar, linear conductive element first side in adjacent spaced-apart relationship at a fourth location along the longitudinal direction, wherein the fourth location is spaced-apart from the first, second, and third locations along the longitudinal direction;

respective seventh and eighth switches electrically connected to the respective seventh and eighth feeds, wherein the seventh switch is configured to selectively connect the seventh feed to ground or to maintain the seventh feed in an open circuit, and wherein the eighth switch is configured to selectively connect the eighth feed to a receiver that receives wireless communications signals or to a transmitter that transmits wireless communications signals or to maintain the eighth feed in an open circuit;

wherein the antenna radiates in a fourth frequency band different than the first, second, and third frequency bands when the first, second, third, fourth, fifth, and sixth switches are open, when the seventh switch electrically connects the seventh feed to ground, and when the eighth switch electrically connects the eighth feed to a receiver or to a transmitter.

34. The antenna according to claim 29 wherein the seventh and eighth switches comprise microelectromechanical systems (MEMS) switches.

35. The antenna according to claim 29 wherein the planar, linear conductive element is disposed on a dielectric substrate.

36. The antenna according to claim 29 wherein the planar, linear conductive element is disposed within a dielectric substrate.

37. The antenna according to claim 29 wherein the planar, linear conductive element has a rectangular-shaped configuration.

38. A wireless communicator, comprising:

a housing configured to enclose a transceiver that transmits and receives wireless communications signals;

a ground plane disposed within the housing; and a multi-frequency planar inverted-F antenna, comprising:

a planar, linear conductive element having opposite first and second sides, wherein the planar, linear conductive element extends along a longitudinal direction, and wherein the planar, linear conductive element is in adjacent, spaced-apart relationship with the ground plane;

first and second feeds electrically connected to the planar, linear conductive element and extending outwardly from the planar, linear conductive element first side in adjacent spaced-apart relationship at a first location along the longitudinal direction;

respective first and second switches electrically connected to the respective first and second feeds, wherein the first switch is configured to selectively connect the first feed to ground or to maintain the first feed in an open circuit, and wherein the second switch is configured to selectively connect the second feed to a transceiver that sends and receives radiotelephone signals or to maintain the second feed in an open circuit;

third and fourth feeds electrically connected to the planar, linear conductive element and extending outwardly from the planar, linear conductive element first side in adjacent spaced-apart relationship at a second location along the longitudinal direction, wherein the second location is spaced-apart from the first location along the longitudinal direction;

respective third and fourth switches electrically connected to the respective third and fourth feeds, wherein the third switch is configured to selectively connect the third feed to ground or to maintain the third feed in an open circuit, and wherein the fourth switch is configured to selectively connect the fourth feed to a transceiver that sends and receives radiotelephone signals or to maintain the fourth feed in an open circuit;

wherein the antenna radiates in a first frequency band when the first switch electrically connects the first feed to ground, when the second switch electrically connects the second feed to the transceiver, and when the third and fourth switches are open;

wherein the antenna radiates in a second frequency band different than the first frequency band when the first and second switches are open, when the third switch electrically connects the third feed to ground, and when the fourth switch electrically connects the fourth feed to a transceiver.

39. The wireless communicator according to claim 38 wherein the first, second, third, and fourth switches comprise micro-electromechanical systems (MEMS) switches.

40. The wireless communicator according to claim 38, wherein the antenna further comprises:

fifth and sixth feeds electrically connected to the planar, linear conductive element and extending outwardly from the planar, linear conductive element first side in adjacent spaced-apart relationship at a third location along the longitudinal direction, wherein the third location is spaced-apart from the first and second locations along the longitudinal direction;

respective fifth and sixth switches electrically connected to the respective fifth and sixth feeds, wherein the fifth switch is configured to selectively connect the fifth feed to ground or to maintain the fifth feed in an open circuit, and wherein the sixth switch is configured to selectively connect the sixth feed to a transceiver that sends and receives radiotelephone signals or to maintain the sixth feed in an open circuit;

wherein the antenna radiates in a third frequency band different than the first and second frequency bands when the first, second, third, and fourth switches are open, when the fifth switch electrically connects the fifth feed to ground, and when the sixth switch electrically connects the sixth feed to a transceiver.

41. The wireless communicator according to claim 40 wherein the fifth and sixth switches comprise micro-electromechanical systems (MEMS) switches.

42. The wireless communicator according to claim 40, wherein the antenna further comprises:

seventh and eighth feeds electrically connected to the planar, linear conductive element and extending outwardly from the planar, linear conductive element first side in adjacent spaced-apart relationship at a fourth location along the longitudinal direction, wherein the fourth location is spaced-apart from the first, second, and third locations along the longitudinal direction;

respective seventh and eighth switches electrically connected to the respective seventh and eighth feeds, wherein the seventh switch is configured to selectively connect the seventh feed to ground or to maintain the seventh feed in an open circuit, and wherein the eighth switch is configured to selectively connect the eighth feed to a transceiver that sends and receives radiotelephone signals or to maintain the eighth feed in an open circuit;

wherein the antenna radiates in a fourth frequency band different than the first, second, and third frequency bands when the first, second, third, fourth, fifth, and sixth switches are open, when the seventh switch electrically connects the seventh feed to ground, and when the eighth switch electrically connects the eighth feed to a transceiver.

43. The wireless communicator according to claim 42 wherein the seventh and eighth switches comprise micro-electromechanical systems (MEMS) switches.

44. The wireless communicator according to claim 38 wherein the planar, linear conductive element is disposed on a dielectric substrate.

45. The wireless communicator according to claim 38 wherein the planar, linear conductive element is disposed within a dielectric substrate.

46. The wireless communicator according to claim 38 wherein the planar, linear conductive element has a rectangular-shaped configuration.

47. A multi-frequency inverted-F antenna, comprising:

a conductive element having opposite first and second sides, wherein the conductive element extends along a longitudinal direction;

a first feed electrically connected to the conductive element and extending outwardly from the conductive element first side at a first location;

a second feed electrically connected to the conductive element and extending outwardly from the conductive element first side at a second location, wherein the second location is spaced-apart from the first location along the longitudinal direction;

a switch electrically connected to the first feed and configured to selectively connect the first feed to ground or to maintain the first feed in an open circuit;

a switch electrically connected to the second feed and configured to selectively connect the second feed to ground or to a receiver that receives wireless communications signals or to a transmitter that transmits wireless communications signals;

a third feed electrically connected to the conductive element and extending outwardly from the conductive element first side at a third location, wherein the third location is spaced-apart from the first and second locations along the longitudinal direction; and a switch electrically connected to the third feed and configured to selectively connect the third feed to the receiver or to the transmitter or to maintain the third feed in an open circuit;

wherein the antenna radiates in a first frequency band when the first feed is electrically connected to ground, when the second feed switch electrically connects the second feed to the receiver or to the transmitter, and when the third feed switch is open; and wherein the antenna radiates in a second frequency band different than the first frequency band when the first feed switch is open, when the second feed is connected to ground, and when the third feed is electrically connected to the receiver or to the transmitter.

48. The antenna according to claim 47 wherein at least one of the feed switches comprises a micro-electromechanical systems (MEMS) switch.

49. The antenna according to claim 47 wherein the conductive element is disposed on a dielectric substrate.

50. The antenna according to claim 47 wherein the conductive element is disposed within a dielectric substrate.

51. The antenna according to claim 47 wherein the conductive element has a rectangular-shaped configuration.

52. A wireless communicator, comprising:

a housing configured to enclose a transceiver that transmits and receives wireless communications signals;

a ground plane disposed within the housing; and an inverted-F antenna, comprising:

a conductive element having opposite first and second sides, wherein the conductive element extends along a longitudinal direction;

a first feed electrically connected to the conductive element and extending outwardly from the conductive element first side at a first location;

a second feed electrically connected to the conductive element and extending outwardly from the conductive element first side at a second location, wherein the second location is spaced-apart from the first location along the longitudinal direction;

a switch electrically connected to the first feed and configured to selectively connect the first feed to ground or to maintain the first feed in an open circuit;

a switch electrically connected to the second feed and configured to selectively connect the second feed to ground or to a transceiver that receives and transmits wireless communications signals;

a third feed electrically connected to the conductive element and extending outwardly from the conductive element first side at a third location, wherein the third location is spaced-apart from the first and second locations along the longitudinal direction; and a switch electrically connected to the third feed and configured to selectively connect the third feed to the transceiver or to maintain the third feed in an open circuit;

wherein the antenna radiates in a first frequency band when the first feed is electrically connected to ground, when the second feed switch electrically connects the second feed to the transceiver, and when the third feed switch is open; and wherein the antenna radiates in a second frequency band different than the first frequency band when the first feed switch is open, when the second feed is connected to ground, and when the third feed is electrically connected to the transceiver.

53. The wireless communicator according to claim 52 wherein at least one of the feed switches comprises a micro-electromechanical systems (MEMS) switch.

54. The wireless communicator according to claim 52 wherein the conductive element is disposed on a dielectric substrate.

55. The wireless communicator according to claim 52 wherein the conductive element is disposed within a dielectric substrate.

56. The wireless communicator according to claim 52 wherein the conductive element has a rectangular-shaped configuration.

* * * * *

UNITED STATES PATENT AND TRADEMARK OFFICE

CERTIFICATE OF CORRECTION

PATENT NO. : 6,662,028 B1
DATED : December 9, 2003
INVENTOR(S) : Hayes et al.

It is certified that error appears in the above-identified patent and that said Letters Patent is hereby corrected as shown below:

Column 1,
Line 37, should read -- example, GSM (Global System for Mobile communication) is a digital --
Line 49, should read -- Positioning System (GPS) technology and Bluetooth™ wireless --
Line 54, should read -- Bluetooth™ technology provides a universal radio interface in --
Line 60, should read -- particular frequencies of GPS and Bluetooth™. --

Figure 4D:
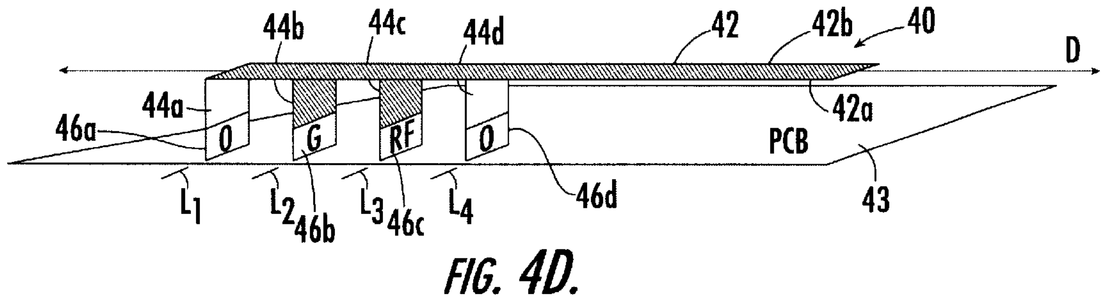

Column 3,
Line 53, insert -- Fig. 4D is a perspective view of the antenna of Fig. 4A, wherein the first feed is open, the second feed is connected to ground, the third feed is connected to RIF circuitry, and the fourth feed is open such that the antenna is operative within a fourth frequency band. --

Column 4,
Lines 16-32 should read -- Fig. 8A is a perspective view of a planar inverted-F antenna having multiple switchable feed points according to another embodiment of the present invention, and wherein first and second feeds are connected to ground, a fourth feed is connected to RIF circuitry, and third, fifth, sixth, and seventh feeds are open such that the antenna is operative within a first frequency band.

Fig. 8B is a perspective view of the antenna of Fig. 8A, wherein the first, second, third and fourth feeds are connected to ground, the fifth feed is connected to RIF circuitry, and the sixth and seventh feeds are open such that the antenna is operative within a second frequency band.

Fig. 8C is a perspective view of the antenna of Fig. 8A, wherein the first, second, third, fourth, fifth, and sixth feeds are connected to ground, and the seventh feed is connected to RIF circuitry, such that the antenna is operative within a third frequency band. --

Column 6,
Line 28, should read -- ground plane 43) or to maintain the first feed in an open circuit. Alternatively, the first feed 44a may be --
Line 66, should read -- Figs. 4A-4D illustrate how the various MEMS switches --

UNITED STATES PATENT AND TRADEMARK OFFICE

CERTIFICATE OF CORRECTION

PATENT NO. : 6,662,028 B1
DATED : December 9, 2003
INVENTOR(S) : Hayes et al.

It is certified that error appears in the above-identified patent and that said Letters Patent is hereby corrected as shown below:

Column 7,
Line 44, insert -- As illustrated in Fig. 4D, the antenna 40 radiates in a fourth frequency band that is different from the first, second and third frequency bands when the first MEMS switch 46a is open (indicated by O), when the second MEMS switch 46b electrically connects the second feed 44b to ground (indicated by G), when the third MEMS switch 46c electrically connects the third feed 44c to a receiver/transmitter (indicated by RF), and when the fourth MEMS switch 46d is open (indicated by O). The fourth frequency band may be greater than the first, second or third frequency bands. However, it is understood that the fourth frequency band may also be a lower frequency band than the first, second, or third frequency bands. --
Line 47, should read -- element 42 of the antenna of Figs. 4A-4D may be formed --

Column 8,
Line 23, should read -- conductive element 42 of Figs. 4A-4D and Figs. 5A-58 --
Line 59, should read -- the third feed to a receiver/transmitter. In the illustrated --

Signed and Sealed this

Third Day of August, 2004

JON W. DUDAS
*Acting Director of the United States Patent and Trademark Office*